United States Patent [19]

Drnevich

[11] 4,183,808
[45] Jan. 15, 1980

[54] PHOSPHATE REMOVAL FROM WASTEWATER

[75] Inventor: Raymond F. Drnevich, Clarence, N.Y.

[73] Assignee: Union Carbide Corporation, New York, N.Y.

[21] Appl. No.: 854,320

[22] Filed: Nov. 23, 1977

[51] Int. Cl.² ............................................. C02C 1/06
[52] U.S. Cl. ........................................ 210/5; 210/6; 210/16; 210/DIG. 29
[58] Field of Search ......................................... 210/3–8, 210/16, DIG. 29

[56] References Cited

U.S. PATENT DOCUMENTS

| | | | |
|---|---|---|---|
| 3,236,766 | 2/1966 | Levin | 210/6 |
| 3,385,785 | 5/1968 | Forrest et al. | 210/6 |
| 3,390,077 | 6/1968 | Forrest et al. | 210/6 |
| 3,522,171 | 7/1970 | Spiegel et al. | 210/6 |
| 3,681,235 | 8/1972 | Topol | 210/6 |
| 3,730,882 | 5/1973 | Levin et al. | 210/6 |
| 3,756,946 | 9/1973 | Levin et al. | 210/6 |
| 3,964,998 | 6/1976 | Barnard | 210/7 |
| 4,042,493 | 8/1977 | Matsch et al. | 210/6 |

OTHER PUBLICATIONS

Vacker et al., "Phosphate Removal Through Municipal Wastewater Treatment at San Antonio, Texas", *Wastewater Pollution Control Federation Journal*, vol. 39, No. 5, 5/1967, pp. 750-771.

*Primary Examiner*—Thomas G. Wyse
*Attorney, Agent, or Firm*—John C. LeFever

[57] ABSTRACT

In activated sludge-type wastewater treatment in which phosphate is taken up in the aeration zone, solids are concentrated in a separate zone to form phosphate-enriched sludge and phosphate is resolubilized in an anoxic zone, a major part of the latter is returned to aeration without intervening phosphate removal and phosphate wasting is solely from sludge.

14 Claims, 3 Drawing Figures

PHOSPHATE REMOVAL FROM WASTEWATER

BACKGROUND OF THE INVENTION

This invention relates to an activated sludge wastewater treatment process for removing phosphate from BOD-containing wastewater to obtain a substantially phosphate free effluent.

In the conventional activated sludge system in use today, wastewater is subjected to the usual screening and pretreatment steps, e.g., primary sedimentation, then mixed with recycled activated sludge to form a mixed liquor which is subjected to aeration with an oxygen-containing gas in an aeration zone. During aeration of the mixed liquor, the bacteria (microorganisms) present in the activated sludge cause the aerobic decomposition of solids and a high degree of BOD removal is achieved.

Phosphates, which are present in organic wastes and detergents, escape conventional wastewater treatment processes and are released with the effluent into natural water resources, e.g., lakes, rivers and streams. These phosphates result in over-fertilization or eutrophication of waters causing unsightly algal blooms and serious pollution problems.

Phosphorus impurities are normally removed from wastewater by chemical treatment (precipitation). Three basic chemical treatment procedures have been proposed for removing phosphorus in association with activated sludge. These procedures include pre-treatment by precipitation and removal upstream of the activated sludge system, post-treatment by precipitation and removal downstream of the activated sludge system, and combined treatment and removal in situ of the activated sludge system.

Pre-treatment is conveniently accomplished by adding precipitating chemicals upstream of or within the primary clarifier so that the chemical sludge and the primary (organic) sludge can be separated together. Post-treatment is accomplished by adding precipitating chemical to the effluent from secondary treatment in a separate mixing tank. The resultant chemical sludge is then separated in an additional clarifier. Combined treatment is practiced by adding phosphorus-precipitating chemicals directly to the mixed liquor in the activated sludge treatment step and thereby removing both carbonaceous matter and phosphorus simultaneously and in the same equipment.

A widely used method for chemically precipitating phosphorus pollutants is by the addition of a metal compound such as aluminum sulfate (alum) or ferric chloride. The phosphorus is precipitated as a result of a chemical reaction with the precipitating agents. Calcium oxide (lime) has also been widely employed to precipitate phosphorus, but the precipitation is pH dependant rather than occuring as a stoichiometric reaction.

The three basic chemical techniques for phosphorus removal have several disadvantages. In phosphorus precipitation, there are other competing chemical reactions within the treatment process which consume a portion of the chemical additive, and dosages substantially in excess of the stoichiometric ratio with phosphorus must be applied in order to obtain desired removals. This effect is especially observed in the pre-treatment and combined-treatment approaches. These techniques also require the treatment of very large volumes of low phosphorus containing liquid which adds to the chemical precipitant requirements, especially when lime is used. Finally, needed large chemical doses result in the generation of large volumes of chemical sludge and produces an additional disposal problem. This is especially acute in the pre-treatment and combined treatment techniques where the chemical sludge contains a large fraction of biologically active material. Moreover, the large volume of inerts that accumulate in the combined treatment approach (e.g., 50% of the total solids) and the necessary increase in sludge wasting required to limit such accumulation may hinder the carbonaceous removal efficiency of the activated sludge system.

As an alternative to pure chemical removal techniques, Levin U.S. Pat. No. 3,236,766 describes a process for biologically removing phosphates from a wastewater stream. Raw or primary treated sewage is aerated with air or enriched oxygen gas together with recycled activated sludge for sufficient duration (i.e., 1 to 8 hours) to cause sludge bacteria present to take-up phosphates in excess of their requirements for growth (luxury uptake). A phosphate-enriched sludge is then separated from a phosphate-depleted effluent. A portion of the phosphate-enriched sludge may be wasted and subsequently converted into fertilizer. The remaining phosphate-enriched sludge is passed to a combination stripper and sludge thickener where it is adjusted to an acidic pH and maintained in the anaerobic condition. The acidic pH and anaerobic condition cause a significant quantity of phosphate to resolubilize and a phosphate-rich liquid is separated from a lower phosphate content sludge. The latter is returned to the aeration zone for the removal of influent phosphates while the phosphate-rich liquid is chemically treated to precipitate phosphate and may then be discharged. The Levin process permits high levels of phosphate removal from wastewater by insuring high phosphate uptake by sludge solids in aeration, subsequently stripping the phosphates from the solids into the associated liquid by a combination of anaerobic and acidic treatment and chemically treating the phosphate-rich liquid separated from the solids. This process effectively avoids the problems that confront chemical phosphorous removal systems. Specifically, the operating costs associated with the chemical precipitant and the quantity of chemical sludge produced have been substantially reduced since a much reduced volume of liquid needs treatment for phosphate removal.

The Levin process requires a considerable time for the released soluble phosphate in the anaerobic sludge, and particularly in the settled sludge in the lowermost section of the stripping zone, to migrate out of the settled sludge layer and into the supernatant liquor in the stripping zone. Such slow migration is a consequence of physical obstruction to the diffusional flow of released phosphate by the thickened sludge solids as well as inherent equilibrium limitations to the mass transfer process. Under such conditions, if the sludge is withdrawn from the stripping zone and recycled to the aeration zone before a sufficient amount of the soluble phosphate is transferred to the supernatant liquor, an excess amount of soluble phosphate is recycled to the aeration zone and the phosphate removal efficiency of the overall process is undesirably lowered.

As a solution of this problem, Matsch et al U.S. Pat. No. 4,042,493 discloses a process for countercurrently stripping soluble phosphates from the phosphate-lower sludge in the stripping zone. In the Matsch et al process, a low phosphate and low solids stripping medium is introduced into the lower section of the stripping zone for upflow through at least part of the settling solids introduced to the stripping zone as phosphate-enriched sludge. In this manner, the phosphate released from the settling sludge solids is transferred to the upflowing liquid to provide the phosphate-rich liquid. As a result, the phosphate stripping zone may be effectively operated in a countercurrent extraction mode to obtain higher removals of phosphate than economically possible with the methods of the prior art.

Matsch et al process is an improvement on the original Levin process but is more complicated from the control standpoint, requires additional equippment, higher power costs and does not eliminate the need for chemical treatment to remove phosphates.

Accordingly, it is an object of this invention to provide an improved process for reducing the phosphate content of phosphate-containing wastewater in an activated sludge wastewater treatment system, which is less complex, uses less equipment, requires less power and eliminates the need for chemical treatment to remove phosphates.

Other objects and advantages will be apparent from the ensuing disclosure and claims.

SUMMARY OF THE INVENTION

This invention relates to an activated sludge wastewater treatment process for removing phosphate from BOD-containing wastewater, characterized by an improved method for operating the aeration zone with an anoxic treatment zone.

The invention involves an activated sludge wastewater treatment process for removing phosphate from BOD-containing influent wastewater is mixed with activated sludge and oxygen-containing gas in an aeration zone to reduce the BOD content of the wastewater and cause the activated sludge bacteria to take up phosphate. Oxygenated phosphate-enriched mixed liquor is formed which is discharged from the aeration zone and passed to a separate zone for concentration of solids to provide a phosphate-depleted effluent and phosphate-enriched sludge. At least part of the latter is passed to an anoxic zone to resolubilize phosphate from the phosphate-enriched sludge and form solubilized phosphate-containing sludge. As used herein, "aeration zone" refers to a biochemical oxidation zone in which the oxygen concentration in the gas over the liquid or liquor is at least about 160 mm. Hg. (corresponding to air at atmospheric pressure) and the dissolved oxygen concentration in the liquid or liquor containing biochemically oxidizable material and bacteria is above about 0.3 mg/l and preferably at least 2 mg/l. Also as used herein "anoxic zone" refers to a zone in which the dissolved oxygen concentration in the liquid or liquor is below about 0.1 mg/l and preferably lower.

More specifically in this invention at least a major fraction of the solubilized phosphate-containing sludge is returned directly to the aeration zone as at least part of the activated sludge needed therein and without intervening addition of a phosphate precipitant for phosphate removal from the so-returning stream. This solubilized phosphate-containing sludge serves to biologically remove phosphate from the BOD-containing influent wastewater in the aeration zone. The average food/biomass ratio of the liquor in the aeration zone during the aforementioned mixing is maintained at a level such that the product of the food/biomass ratio (in pounds $BOD_5$/day×pounds volatile suspended solids) and the influent wastewater food/influent phosphorus ratio (in pounds $BOD_5$ per 1 pound phosphorus) is at least 10. Phosphate is removed from the process solely in the purified effluent and by wasting at least one of the sludges.

It was surprising that under these process conditions the anoxic-conditioned sludge biologically removes the phosphate impurities from the influent wastewater even though the sludge has substantially its full content of resolubilized phosphates. The process has demonstrated the capability of removing at least 85%, (# Total Phosphorus influent −# Ortho Phosphorus effluent)×100/# Total Phosphorus influent, of the phosphate in the influent wastewater to provide effluent with acceptable low phosphate concentration without chemical treatment and the attendant equipment and chemical costs.

DESCRIPTION OF THE PREFERRED EMBODIMENT

Figure 1:
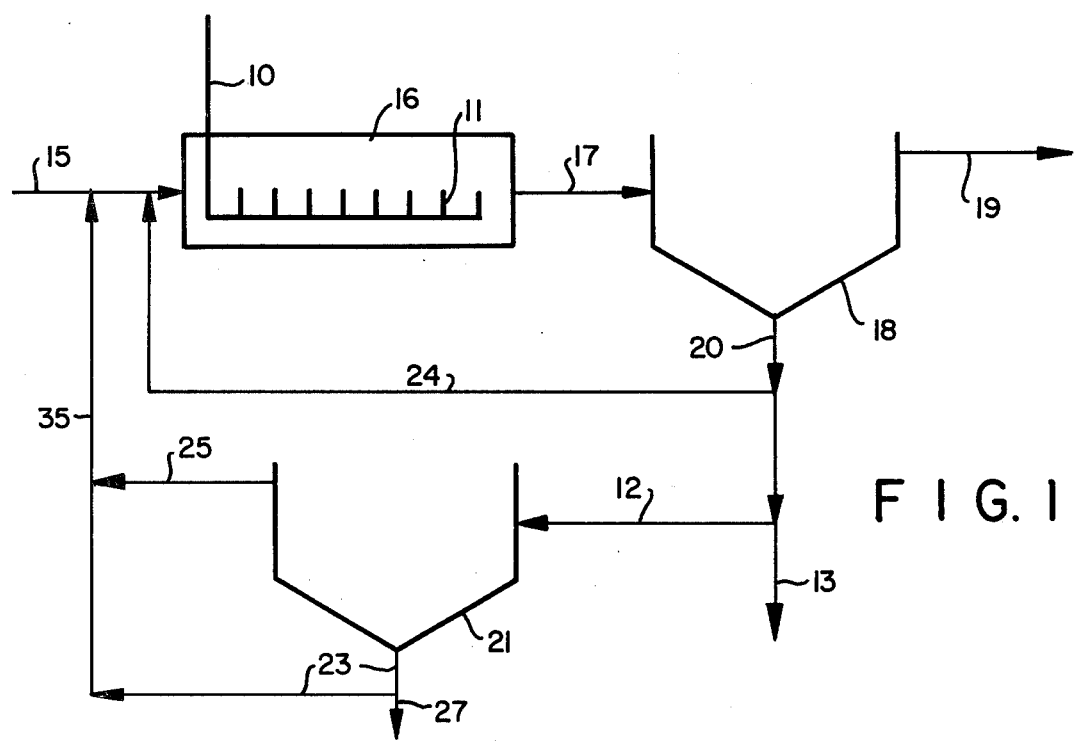
FIG. 1 is a schematic flowsheet of apparatus capable of practicing one embodiment of the invention wherein wastewater is aerated in an open tank with air.

Referring now to the drawings and FIG. 1, phosphate-containing influent wastewater such as municipal sewage is introduced through conduit 15 to aeration tank 16 and mixed with oxygen-containing gas such as air which is introduced in a well-known manner through conduit 10 and diffusing means 11. Also mixed therewith is recycled soluble phosphate-containing sludge from conduit 35 and recycled phosphate-enriched sludge from conduit 24, both to be more fully described hereinafter. By mixing in aeration zone 16 the BOD content of the wastewater is reduced and the activated sludge bacteria take up phosphate to form oxygenated phosphate-enriched mixed liquor. The dissolved oxygen content of this liquor is at least 0.3 mg/l and the aeration period is typically between 0.5 and 8 hours although longer periods may be required for industrial wastewaters having high BOD concentration.

After aeration is complete the mixed liquor is passed through conduit 17 to clarification vessel 18 as the solids concentration zone. In the latter phosphate-enriched sludge is gravity-separated from the liquor and a phosphate-depleted effluent is discharged for disposal in a conventional manner through conduit 19.

The separated phosphate-enriched sludge is withdrawn from solids concentration zone 18 through conduit 20 and a fraction may (but need not) be returned directly to aeration zone 16 without intervening treatment through conduit 24. Another portion of the phosphate-enriched sludge from conduit 20, preferably comprising a major fraction thereof, is passed through conduit 12 to anoxic zone 21. In this particular embodiment another minor fraction of the phosphate-enriched sludge is wasted through conduit 13.

In anoxic zone 21 the phosphate-enriched sludge is settled and at least the major portion thereof is maintained under anoxic conditions to release phosphate to the liquid phase. It will be recognized that if the zone or tank 21 is open to the atmosphere, the top blanket level will contain a significant concentration of oxygen, i.e., higher than the aforementioned 0.1 mg/l dissolved oxygen. The sludge holding time sufficient to release phosphate to the liquid phase of the anoxic settling sludge is between 2 and 20 hours. The required residence time for phosphate release or solubilization will depend in part on the aerobic or anoxic character of the phosphate-enriched sludge being passed to the anoxic zone. In some embodiments the dissolved oxygen content of the phosphate-enriched mixed liquor discharged from aeration zone 16 may be partially depleted in the solids concentration zone 18 such that the sludge underflow removed therefrom has a low DO, i.e., less than the preferred value of at least 0.3 mg/l. One advantage of such low dissolved oxygen concentration in the phosphate-enriched sludge is that the entire volume of settling sludge in anoxic zone 21 may be maintained under anoxic conditions which in turn permits a comparatively shorter sludge residence time in the anoxic zone to be employed for phosphate release. The dissolved oxygen of the phosphate-enriched sludge in solids concentration zone 18 is preferably maintained above 0.3 mg/l so as to avoid release and mixing of phosphates in this zone such as would impair the quality of the effluent discharged from the process in conduit 19. On the other hand, where the phosphate-enriched sludge passed to the anoxic zone 21 is highly aerobic in character, a comparatively greater sludge residence time in the anoxic zone (a disadvantage in terms of required tankage size) will be required to achieve the requisite phosphate release.

The anoxic zone may be a thickening tank as illustrated in FIG. 1, or alternatively a plug flow or completely mixed tank. The embodiment described in conjunction with FIG. 1 is preferred in applications where the sludge is recovered from the solids concentration zone 18 is highly aerobic in character. The use of a thickening tank as the anoxic zone 21 permits the sludge to more rapidly attain anoxic conditions than would otherwise occur in a plug flow or completely mixed tank. This effect occurs because as the sludge is thickened, the biological solids thereof are concomitantly associated with a smaller quantity of dissolved oxygen-containing liquid. Therefore, the biological solids are able to more rapidly deplete this source of oxygen. Where the anoxic zone 21 comprises a thickening or plug flow tank, the vessel need not be covered. However, if a well-mixed tank is used as the anoxic zone, the tank should preferably be covered.

As indicated hereinabove, the sludge residence time in the anoxic zone 21 in the broad practice of the invention must be within the range of 2–20 hours. If a residence time of less than 2 hours is employed, the sludge is not fully conditioned to again take up phosphate in the aeration zone 16. Under such conditions, the phosphate in the influent wastewater fed to the aeration zone 16 is not fully removed and passes out of the system in the effluent from the secondary settling zone. If, on the other hand, the sludge residence time in the anoxic zone 21 exceeds 20 hours, then the size of the vessel required for phosphate solubilization becomes excessively large and expensive, without any countervailing improvement in the level of phosphate removal achieved. Under these considerations, it is preferred to maintain the sludge residence time in the anoxic zone 21 within the range of 4–10 hours.

After the phosphate is released to the liquid phase of the anoxic sludge, a soluble phosphate-enriched liquid is withdrawn from the anoxic zone upper section in conduit 25 and a lower phosphate content sludge is withdrawn from the lower section of anoxic zone 21 through conduit 23. These streams are returned to aeration zone 16 as the solubilized phosphate-containing sludge either as a combined flow in conduit 35 as illustrated or separately. The latter represents at least part of the activated sludge required in aeration zone 16, and in FIG. 1 a fraction of the phosphate-enriched sludge from solids concentration zone 18 is recycled through conduit 24 as the remainder of the activated sludge requirement.

Phosphorus is removed from the system by way of the waste sludge fractions which may be proportioned in any manner between the solids concentration zone waste fraction in conduit 13, the anoxic zone waste fraction in conduit 27, and the effluent suspended solids. The major constraint is that the total waste sludge fractions correspond substantially to the fraction of material that is accumulated in the aeration zone 16 by the reduction of the $BOD_5$ content of the wastewater stream. Moreover, subsequent treatment of the waste sludge should not return significant quantities of the wasted phosphorus to the activated sludge system. Preferably, the entire quantity of wasted sludge is removed by way of conduit 13.

This invention permits removal of at least 85% and preferably at least 90% of the total phosphorus introduced in the wastewater influent. Such level of removal is achieved in the system of Matsch et al. U.S. Pat. No. 4,042,493 but with chemical addition, and represents a substantial improvement in the state-of-art as compared to a conventional activated sludge system.

Stated otherwise, in the present process the necessary quantity of high phosphate-containing solids is continuously produced which, when wasted from the activated sludge system, results in at least 85 percent overall phosphorus removal. The biological solids are conditioned to take up large quantities of phosphorus by the repetitive aerobic-anoxic cycling of the sludge solids. In fact, whereas an aerobic only activated sludge system typically produces a sludge with a mass of phosphorus per mass of volatile sludge solids ratio of below about 0.025, an activated sludge system employing aerobic-anoxic cycling typically produces a sludge with a mass of phosphorus per mass of volatile sludge solids ratio between about 0.025 and 0.08. However, the mere practice of aerobic-anoxic cycling alone does not ensure the removal of sufficient quantities of the influent phosphorus with the waste sludge. The system must also produce a sufficient quantity of biomass of the high phosphate content to remove the influent phosphorus. To do this, it has been discovered that the food-to-biomass ratio (F/M) must be maintained at a level such that the product of this ratio and the quotient of the influent $BOD_5$ concentration and the total influent phosphorus concentration (hereinafter referred to as the control parameter) remains above about 10. At values of the control parameter below about 10, there is insufficient biomass generated within the aeration zone 16 to continuously enable greater than 85% overall phosphorus removal by way of the waste sludge fractions. The generation of biomass in an activated sludge system is primarily dependent upon the quantity and condition of the substrate food in the influent wastewater and the growth rate of the bacteria, which is directly related to the rate at which the bacteria metabolize or utilize the substrate food. Competing with biomass generation is biomass depletion by virtue of bacteria death and predation. Additionally, a quantity of the energy produced by substrate food utilization will also be diverted to cell maintenance rather than growth. The net biological yield is, therefore, the difference between synthesis and depletion. The necessary magnitude of the control parameter is fixed by the value of this net biological yield. Maintaining the control parameter at a value of about 10 is sufficient for sludges with relatively high net biological yields, characteristic of most municipal sludges. However, for biological sludges with proportionately lower net biological yields, a higher value of the control parameter is preferred so as to maintain the required level of net cellular synthesis. Normally, wastewaters which require values of the control parameter greater than about 12 with low $BOD_5$-INF/$P_{Total}$-INF ratios require a high food-to-biomass ratio (F/M) to insure sufficient biomass generation. Streams with high $BOD_5$-INF/$P_{Total}$-INF ratios require correspondingly lower food-to-biomass ratio (F/M) Since F/M values greater than 1.5 lb. $BOD_5$ App/day-lb MLVSS are not normally employed in the activated sludge process because of the detrimental effect on biological oxygen demand reduction, at these high loadings this invention is preferably used with a wastewater stream having a $BOD_5$-INF/$P_{Total}$-INF ratio above about 6.7. On the other hand, the F/M value is preferably maintained above about 0.4 lb BOD-App/day-lb MLVSS. At biological loadings below this value, significant nitrification may occur which will excessively prolong the required anoxic retention time and thereby increase tankage requirements.

Figure 2:
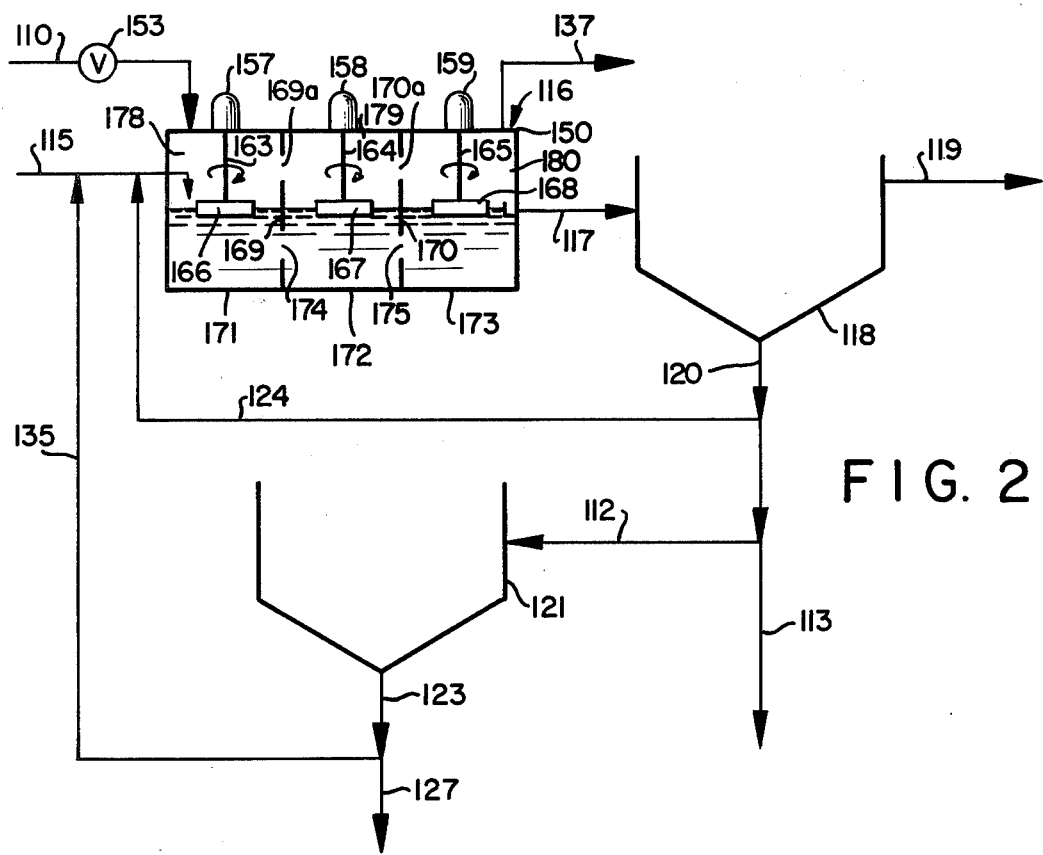
FIG. 2 is a schematic flowsheet of apparatus capable of practicing another embodiment of the invention wherein wastewater is aerated in a closed tank by oxygen-rich gas.

FIG. 2 represents apparatus for practicing another embodiment of the invention, including a staged aeration system employing high purity oxygen feed gas in a manner as taught by U.S. Pat. Nos. 3,547,812–3,547,815 to J. R. McWhirter et al., incorporated herein to the extent pertinent. In the practice of oxygenation of BOD-containing water as taught by the J. R. McWhirter et al. patents, at least one enclosed covered aeration chamber is employed wherein the liquid undergoing treatment is intimately contacted in the presence of activated sludge with oxygen-enriched gas from an overlying gas space to dissolve the oxygen necessary for aerobic biological activity. Such oxygenation systems provide substantial advantages over prior art treatment systems wherein atmospheric air is used as the oxidant in open aeration chambers. For example, the closed chamber oxygenation aeration system is able to operate at biological suspended solids levels several times greater and liquid retention times much smaller than those of air aeration systems while maintaining comparable or better overall levels of wastewater treatment. Such advantages are in part a consequence of the higher mass transfer driving force for oxygen-enriched gas relative to air which permits higher dissolved oxygen levels to be achieved with economic levels of volumetric oxygen transfer rate per unit of power input.

In the FIG. 2 system, the aeration zone comprises liquid enclosure 116 which contains three oxygenation sub-zones 171, 172 and 173, with partition walls 169 and 170 between the first and second and the second and third subzones, respectively, and a cover 150 over the upper ends of the subzone walls to enclose the aeration zone and to form first, second and third gas spaces 178, 179 and 180 respectively. Phosphate- and BOD-containing influent wastewater enters the first oxygenation subzone through conduit 115. Conduit 110, having flow control means comprising control valve 153 therein, is provided for flow of at least 50% by volume oxygen feed gas into first subzone 171. Means are provided in each subzone for mixing the fluids and continuously recirculating one fluid against the others. They may be mechanically separate or certain types of apparatus may perform both functions. Surface aeration means comprising rotatable impellers 166, 167 and 168 positioned at the surface of the liquor are provided within the respective subzones 171, 172 and 173 for mixing and continuous recirculation of the liquor against the oxygen-enriched aeration gas in the respective gas spaces 178, 179 and 180. The rotatable impellers 166, 167 and 168 are driven by the corresponding motors 157, 158 and 159 by means of shafts 163, 164 and 165.

The partition walls 169 and 170 in FIG. 2 aeration zone extend from the floor of enclosure 116 up to the cover 150 overlying the oxygenation subzones and are provided with restricted openings for cocurrent flow of gas and liquor from subzone to subzone. Restricted opening 174 provides flow of partially oxygenated liquor from first subzone 171 to second subzone 172 and restricted opening 175 provides flow of further oxygenated liquor from second subzone 172 to third subzone 173. The illustrated aeration zone thus provides a close approach to true plug flow of liquor, with the liquor velocity through restricted openings 174 and 175 sufficient to prevent backmixing. The liquor in each subzone is substantially uniform in composition and the BOD content progressively declines from the wastewater feed subzone 171 to the liquor discharge subzone 173. Finally oxygenated liquor is discharged from the terminal oxygenation subzone 173 through liquid discharge conduit 117 to the solids concentration zone 118. Oxygenation aeration zone 116 is provided with flow restricting openings in the upper portions of the partitions between adjacent subzones above the liquid level in the subzone. Aeration gas from the first subzone 171 flows through opening 169a into second subzone 172 as its aeration gas, and with sufficient pressure differential to prevent backmixing. This gas has lower oxygen content than the feed and contains impurities such as carbon dioxide released from the liquor. In second subzone 172 an additional oxygen portion of the aeration gas is consumed by dissolution and bio-oxidation in the partially oxygenated liquor, and additional gases other than oxygen evolve into the aeration gas from the liquor. Further oxygen-depleted gas flows through the restricted opening 170a into third subzone 173 for mixing therein with further oxygenated liquor. The third subzone 173 operates in the same manner as second subzone 172, and aeration gas of lowest oxygen content and highest impurity content is vented from the third subzone through conduit 139.

The phosphate-containing influent wastewater enters the system in conduit 115 and is joined in covered aeration zone 116 with recycled soluble phosphate-containing sludge (to be described more fully hereinafter) from conduit 135 and recycled phosphate-enriched sludge from conduit 124. The oxygen feed gas is provided through conduit 110 and control valve 153 therein to first subzone 171 in sufficient quantity to provide a mixed liquor dissolved oxygen concentration of preferably at least 2 ppm therein. In the first subzone 171, the influent wastewater, recycled activated sludge, recycled soluble phosphate-containing sludge and oxygen feed gas are mixed and the mixed liquid-solid is recirculated against the oxygen gas therein. Partially oxygenated liquor and partially oxygen-depleted gas are separately cocurrently flowed from first subzone 171 to the second subzone 172 by the respective flow openings 174 and 169a in partition 169 to second subzone 172 for further mixing and recirculation therein. From the second subzone, the further oxygenated liquid and further oxygen-depleted gas flow separately and cocurrently by the respective flow openings 175 and 170a in partition 170 into third subzone 173 for final mixing and fluid recirculation therein. Oxygenated phosphate-enriched mixed liquor is discharged from the final subzone 173 through the previously described conduit 117. Oxygen-depleted gas is separately discharged from the final subzone through gas vent conduit 139.

The retention time of the mixed liquor in the aeration zone 116 is selected to provide sufficient duration, for example about 1-2 hours, to reduce the BOD content of the wastewater to a suitably low level to generate a sufficient quantity of biomass for sludge wasting and cause the bacteria present in the activated sludge to take up phosphate. In this manner the oxygenated liquor discharged from the final oxygenated subzone 173 is enriched in phosphate content.

This liquor is separated into phosphate-depleted effluent and phosphate-enriched sludge in solids concentration zone 118. It is to be understood that although the separation of the phosphate-enriched sludge from the aerated mixed liquor is illustratively described in connection with a settling zone, e.g., conventional clarification chamber, it would also be possible to effect the separation of the mixed liquor by other methods such as air flotation. A solids-depleted purified substantially phosphate-free liquid is formed which rises in clarifier 118 to the liquid-air interface and is discharged through conduit 119 as effluent. The separated phosphate-enriched sludge is withdrawn through conduit 120 and preferably at least a major fraction thereof is passed to anoxic zone 121 through conduit 112. At least a major portion of the sludge in zone 121 is maintained under anoxic conditions to release phosphate from the phosphate enriched sludge. In the anoxic zone 121, the sludge residence time is maintained at a value of between 2 and 20 hours. Another fraction of the phosphate enriched sludge may be recycled directly to the aeration zone through conduit 124 as part of the recycled sludge. A final minor fraction of the phosphate-enriched sludge may be passed to waste through conduit 113.

The soluble phosphate-containing sludge formed in the anoxic zone is withdrawn from the lower section of the anoxic zone 121 in conduit 123 and is recycled in conduit 135 to oxygen aeration zone as at least a fraction of the activated sludge. Another portion of this sludge may be wasted through conduit 127 and together with the sludge in conduit 113 comprises the sole mode of phosphate removal. In the illustrative oxygenation system, the volume ratio of recycling activated sludge fractions/BOD- and phosphate-containing influent wastewater is preferably maintained in the range of 0.02 to 0.5.

In operation of the FIG. 2 embodiment the sludge is recycled to first aeration subzone 171 at a rate so as to maintain the desired total solids concentration (MLSS) as for example 6000 mg/l, and volatile suspended solids concentration (MLVSS) as for example 4500 mg/l. Broad suitable ranges for these parameters are 4000-8000 mg/l MLSS and 3000-6000 mg/l MLVSS. The food-to-biomass ratio is preferably in the range of 0.4-1.5 gm $BOD_5$/(day×gm MLVSS), for example about 0.68. The recycled phosphate-content sludge concentration (MLSS) in conduit 135 may be in the range of 10,000-50,000 mg/l. The oxygen gas is introduced through conduit 110 in sufficient quantity to maintain dissolved oxygen concentration (DO) in the mixed liquor of 4-8 mg/l and for example 6 mg/l. Oxygen control valve 153 may be automatically adjusted in response to sensed oxygen vapor pressure in the overhead gas space as monitored by suitable sensor and transmitting means (not shown), arranged in a manner well known to those in the art.

Figure 3:
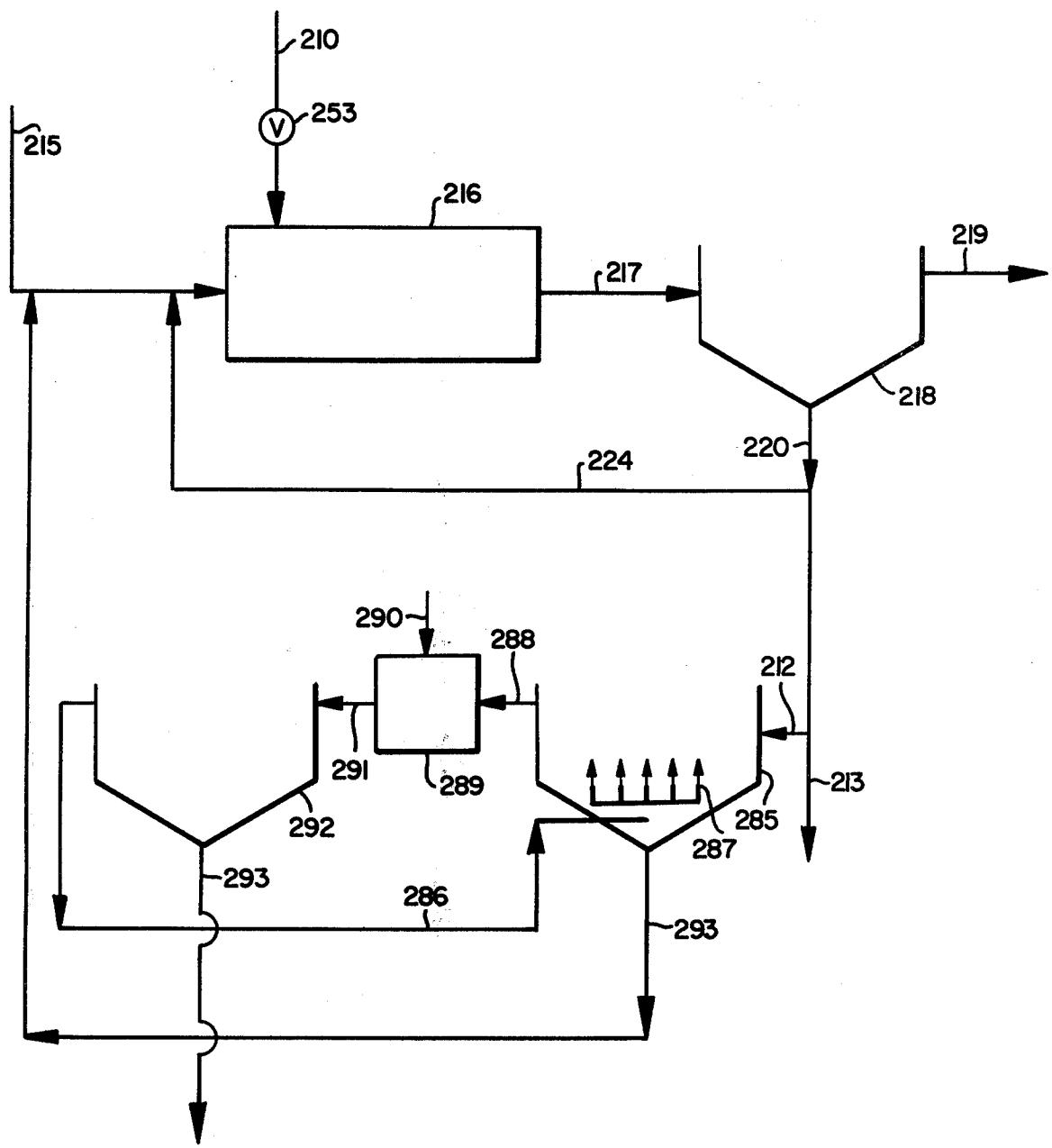
FIG. 3 is a schematic flowsheet of apparatus capable of practicing the phosphate-removal process of Matsch et al U.S. Pat. No. 4,042,493 in which chemical addition is employed.

FIG. 3 illustrates apparatus useful in practicing one embodiment of the previously described process of Matsch et al. U.S. Pat. No. 4,042,493, a prior art system of phosphorus removal by chemical addition for precipitation. Corresponding elements to the present invention as illustrated in FIGS. 1 and 2 have been identified by numerals with the same last two digits. The phosphate-enriched sludge is discharged from solids concentration zone 220 into conduit and a fraction thereof is passed through conduit 212 to anerobic stripping zone 285. A low phosphate and low solids stripping medium comprising chemically treated overflow liquid is introduced through conduit 286 and openings such as multiple nozzles 287 to the base of zone 285 for upflow through the settling solids introduced as phosphate-enriched sludge.

The phosphate released from the settling sludge solids is transferred to upflowing liquid and phosphate-rich liquid is discharged from the stripper upper section through conduit 288 for flow to quick mix tank 289. The phosphate-enriched liquid is rapidly mixed (by means not shown) with a phosphate precipitant such as lime, introduced to the tank through conduit 290. The supernatant liquor-phosphate precipitant mixture is then passed by conduit 291 to flocculator tank 292 in which the precipitated phosphate is settled and removed from the system as waste chemical sludge in conduit 293. The overflow phosphate-depleted supernatant from the flocculator tank 292 is recycled through conduit 286 to stripper 285 for use as the stripping fluid previously described.

The present invention may be compared with the prior art system of FIG. 3, based on actual operating data for the latter, and calculations therefrom for the instant process. The aeration zone was the general type illustrated in FIG. 2, employing 99.5% oxygen feed gas and form subzones with cocurrent flow of aeration gas and liquor from the inlet to the discharge end. This comparison is summarized in Table I, showing that the same phosphorus removal (97%) was achieved without chemical addition, thereby eliminating quick mix tank 289 flocculator 292 and the joining piping.

TABLE I

| Process Parameter | Elutriation With Chemically Treated Stripper Overflow Liquid | Phosphate Removal Solely Through Sludge Wasting |
|---|---|---|
| Wastewater Influent Flow (gpm) | 13 | 13 |
| P-Rich Sludge Recycle Rate (gpm) | 3.12 | 3.12 |
| Sludge Wasting Rate (gpd) | 140 | 140 |
| Anoxic Zone Feed (gpm) | 3.08 | 3.08 |
| Anoxic Zone Underflow (gpm) | 2.82 | 3.08 |
| Anoxic Zone Overflow (gpm) | 1.69 | 0 |
| Elutriation Flow to Anoxic Stripper (gpm) | 1.43 | 0 |
| Ratio Elutriation/Stripper Overflow | 0.77 | 0 |
| Aeration Zone MLSS (mg/l) | 3624 | 3624 |
| Aeration Zone MLVSS (mg/l) | 2710 | 2710 |
| Concentration Zone ESS (mg/l) | 10 | 10 |
| Concentration Zone EVSS (mg/l) | 6 | 6 |
| Concentration Zone RSS (mg/l) | 18535 | 18535 |
| Concentration Zone (mg/l) | 13982 | 13982 |
| $BOD_5$ Inf. (mg/l) | 139 | 139 |
| $BOD_5$ Eff. (mg/l) | 9 | 9 |
| F/M (#BOD App/day - MLVSS) | 0.63 | 0.63 |
| RT Aeration (hr) | 1.9 | 1.9 |
| RT Anoxic (hr) | 5.9 | 5.9 |
| Total Phosphorus (mg/l) | | |
|   Influent | 6.6 | 6.6 |
|   Effluent | 0.5 | 0.7 |
|   Stripper Underflow (Soluble) | 34.0 | about 80 |
|   Stripper Overflow | 43.0 | — |
|   Concentration Zone Underflow | 385 | 769 |
|   Effluent Ortho Phosphorus | 0.2 | 0.2 |
| # P/# VSS in Concentration Zone Underflow | 0.028 | 0.055 |
| # $BOD_5$ Inf/# Phosphorus Inf. | 21.1 | 21.1 |
| (F/M) × ($BOD_5/P_{Total}$) Inf. | 13.3 | 13.3 |
| % Phosphorus Removed | 97.0 | 97.0 |
| Chemical Requirement (lime, #/Day) | about 4.0 | 0 |

Another pair of tests were conducted in which primary treated wastewater was first used continuously during a nine day operating period as a stripping or elutriation medium in a stripping zone similar to tank 285 (FIG. 3). The stripper supernate corresponding to the flow in conduit 288 and was discharged to waste although it would be passed to a quick-mix tank for lime addition in a complete system. During the succeeding ten day period the elutriant flow was discontinued and the soluble phosphate enriched liquid supernate was returned to the aeration zone in the manner illustrated by FIG. 1, through conduits 25 and 35. The aeration system comprised three interconnected cylindrical aeration basins each 8 inches in diameter by 60 inches in height equipped with air diffusers. The liquor was staged from basin-to-basin and a 13 gallon gravity type clarifier was used as the solids concentration zone. The anoxic stripper volume was 16.25 gallons. The data from these tests are summarized in Table II, and shows that substantially the same percent phosphorus removal was achieved in the second test period without lime addition and its attendant complexities.

TABLE II

| Process Parameter | First Test Period | Second Test Period |
|---|---|---|
| Influent Flow (lph) | 29.7 | 30.2 |
| P-rich Sludge Recycle Rate (lph) | 3.1 | 3.1 |
| Anoxic Feed (lph) | 3.1 | 3.1 |
| MLSS (mg/l) | 3600 | 2600 |
| MLVSS (mg/l) | 2660 | 1950 |
| ESS (mg/l) | 59 | 43 |
| EVSS (mg/l) | 48 | 32 |
| $BOD_5$ INF (mg/l) | 80 | 124 |
| $BOD_5$ EFF (mg/l) | 29 | 39 |
| F/M (#BOD App/Day-#MLVSS) | 0.19 | 0.4 |
| RT Aeration (hr) | 3.82 | 3.76 |
| RT Anoxic (hr) | 10.3 | 13.4 |
| Total Phosphorus | | |
|   Influent | 3.1 | 2.9 |
|   Effluent | 1.4 | 1.6 |
|   Effluent Ortho Phosphorus | 0.1 | 0.1 |
| (F/M) × ($BOD_5/P_{Total}$)$_{INF}$ | 4.9 | 17.1 |
| % Phosphorus Removed | 96.8 | 96.6 |

Although preferred embodiments have been described in detail, it will be further appreciated that other embodiments are contemplated only with modifications of the disclosed features as being within the scope of the invention.

It should be noted that as used herein, the average food/biomass ratio is based upon the sum of volatile suspended solids in all oxygenation zones where more than one zone is employed. In embodiments wherein the liquor is staged through several zones the ratio will vary widely from the average value, being much higher in the initial treatment zone and far lower in the final treatment zone. By way of illustration, if four liquor treatment zones are employed with equal flow rate and MLVSS but different liquor retention times $T_1$, $T_2$, $T_3$ and $T_4$, and corresponding food/biomass ratios of 0.4, 0.3, 0.2 and 0.1, the average ratio is $$(0.4T_1 + 0.3T_2 + 0.2T_3 + 0.1T_4)/(T_1 + T_2 + T_3 + T_4)$$

What is claimed is:

1. In an activated sludge wastewater treatment process for removing phosphate from BOD-containing wastewater in which phosphate-containing influent wastewater is mixed with activated sludge and oxygen-containing gas in an aeration zone to reduce the BOD content of the wastewater and cause the activated sludge bacteria to take up phosphate to form oxygenated phosphate-enriched mixed liquor which is discharged from said aeration zone and passed to a separate zone for concentration of solids to provide a phosphate-depleted effluent and phosphate-enriched sludge at least part of said phosphate-enriched sludge is passed to an anoxic zone to resolubilize phosphate from the phosphate-enriched sludge and form solubilized phosphate-containing sludge, the improvement comprising: returning at least a major fraction of said solubilized phosphate-containing sludge directly to said aeration zone as at least part of said activated sludge and without intervening addition of a phosphate precipitant for phosphate removal therefrom to biologically remove phosphate from said BOD-containing influent wastewater, maintaining the average food/biomass ratio of said liquor in said aeration zone during said mixing at a level such that the product of the food/biomass ratio (in pounds $BOD_5$/day×pound volatile suspended solids) and the influent wastewater food/influent phosphorus ratio (in pounds $BOD_5$ per 1 pound phosphorus) is at least 10, and removing phosphate from the process solely by wasting from at least one of said sludges.

2. A process according to claim 1 wherein at least part of said phosphate is removed by wasting a minor part of said phosphate-enriched sludge.

3. A process according to claim 1 wherein at least part of said phosphate is removed by wasting a minor fraction of said solubilized phosphate-containing sludge.

4. A process according to claim 1 wherein a minor fraction of said phosphate-enriched sludge is returned directly to said aeration zone as another part of said activated sludge.

5. A process according to claim 1 wherein at least 85% of the phosphate in said influent wastewater is removed in the wasted sludge.

6. A process according to claim 1 wherein at least 90% of the phosphate in said influent wastewater is removed in the wasted sludge.

7. A process according to claim 1 wherein the liquor is retained in said aeration zone for a period between 0.5 and 8 hours.

8. A process according to claim 1 wherein the dissolved oxygen content of said phosphate-enriched sludge is at least 0.3 mg/l.

9. A process according to claim 1 wherein said phosphate-enriched sludge is thickened in said anoxic zone to form lower phosphate content sludge and soluble phosphate-enriched liquid, and all of said soluble-enriched liquid and at least a major fraction of said lower phosphate content sludge are returned to said aeration zone.

10. A process according to claim 1 wherein said phosphate-enriched sludge is maintained under anoxic conditions for a period between 2 and 20 hours.

11. A process according to claim 1 wherein the product of the food/biomass ratio and the influent wastewater food/influent phosphorus ratio is at least 12.

12. A process according to claim 1 wherein the food/biomass ratio in said aeration zone is at least 0.4.

13. A process according to claim 1 wherein the influent wastewater food/influent phosphate ratio is below 6.7 and the food/biomass ratio in said aeration zone is at least 1.5.

14. A process according to claim 1 wherein said phosphate-enriched sludge is maintained under anoxic conditions for a period between 4 and 10 hours.

* * * * *